Feb. 28, 1956      D. S. JOHNSON      2,736,122
MID-WATER TRAWL

Filed Aug. 14, 1953      2 Sheets-Sheet 1

Inventor
Donald S. Johnson
By Alan Ausabey
Attorney

Feb. 28, 1956  D. S. JOHNSON  2,736,122
MID-WATER TRAWL
Filed Aug. 14, 1953  2 Sheets-Sheet 2

Inventor
Donald S. Johnson
By Alan Ausbey
Attorney

United States Patent Office 2,736,122
Patented Feb. 28, 1956

2,736,122
MID-WATER TRAWL

Donald S. Johnson, Ketch Harbour, Nova Scotia, Canada, assignor to Drummondville Cotton Company Limited, Montreal, Quebec, Canada, a corporation of Canada Application August 14, 1953, Serial No. 374,353

4 Claims. (Cl. 43—9)

This invention relates to a method of trawling and to trawling equipment, more particularly used in mid-water trawling.

The catch available in commercial fishing may be classified into ground fish (for example, haddock, cod, hake or halibut), pelagic fish (for example, mackerel, herring or pollock), and glutted fish (ground fish full of bait).

Ground fish may be caught by trawling, for example, with an otter trawl. (See "Ocean Harvest" published 1946 by Superior Publishing Company, Seattle, Washington.) But, this has the disadvantage that the trawl is designed to fish on the sea bed. The disadvantage here is that the trawl is useful only for ground fish and cannot catch pelagic fish or glutted fish which are abundant.

Another disadvantage of trawling on the sea bed is that the net becomes damaged by getting snarled with rocks and other obstructions and also becomes fouled with foreign matter for example, mud or weed, and this increases the effort required to fish.

Pelagic fish can usually only be caught by using a seine or gill net or some other trap device. This method of fishing has the disadvantage that it can only be used in moderate weather and in coastal waters.

Glutted fish are usually only available by hand line which is an outmoded, slow method.

These disadvantages have been observed and certain means suggested for mid-water trawling. One of these is described as the "Danish Floating Trawl" in Fishery Leaflet 343, of the United States Fish and Wildlife Service, of the Department of the Interior, Washington 25, D. C.

Two trawlers are employed. Each tows a pair of towing warps. One warp of each pair is connected to the bottom and top respectively of the side of the mouth of a specially designed net. This operation has the great disadvantage that two trawlers are required. There are also four lines to contend with. And one trawler has to come alongside the other trawler to pass over its lines before the fish are hauled. The vessels would have to be abreast with the same length of towing warp out. This is difficult to achieve and the operation could only be carried out in relatively smooth weather.

Another suggestion for mid-water trawling is disclosed in the "Fishing Gazette" for March 1951, as the idea of Friedrich K. Schatz of Tanganyika, Africa. This gear consists of a drag net. Otter-boards are dispensed with a is the third board above the top line which serves to keep the net wide open. Two nets are towed by spaced apart towing warps. A kite, connected to the towing vessel by a separate warp end to the nets by additional lines is provided for depth adjustment. The disadvantages to this gear are the complications involved. There are a number of lines to contend with. There is no positive way of keeping the net open and the manipulations involved are not familiar to the commercial fishing industry.

Applicant's development

The applicant has developed a method of fishing and equipment for mid-water trawling which overcomes the disadvantages set out above and provides certain positive advantages and which can be immediately put in use on a trawler equipped for the otter trawl without changes or additions in gear. The operations involved are also familiar to a crew used to using an otter trawl.

The applicant's method includes trawling, preferably from a single vessel with a trawl towed by two towing warps connected to a pair of planing members or doors which in turn are connected to the mouth of the net. The planing members and the connections are such that the net is retained by the planing members at mid-water level which may be adjusted by varying the speed of the trawling and the mouth of the net is held open. The method also includes the concept of observing from the vessel the vertical position of a school of fish and applying this observation to immediate adjustment of the speed of trawling to bring the mouth of the net to the level of the school of fish whereby fish are netted by the net when the latter arrives at the observed position.

Observation can be by conventional means, preferably by an echo sounder at the bow of the boat. This is particularly effective with scale fish, for example, mackerel and herring.

A trawl, according to the invention, suitable for carrying out the above method includes the following features. It includes a fish net having a mouth and spaced apart bridles or wings on respective sides of the mouth. The planing devices preferably each include a pair of non-buoyant doors of symmetrical tapering outline and means are provided which connects each door to one of the bridles or wings. A towing warp connects each wing to a trawler. The connections are such in the combination that when the trawl is towed the doors tend to sink but plane outwards at all speeds, and the doors and net rise under water pressure at increased speeds. At all speeds the net is thus in a fishing position.

This application is a continuation-in-part of United States application Serial No. 308,397 filed September 8, 1952.

Detailed description

Having thus generally summarized the invention, it will now be described in more detail by reference to the accompanying drawings illustrating, by way of example, preferred forms of trawling gear according to the invention, and in which.

Referring more particularly to the drawings, the various elements of the trawling gear are shown as follows:

A represents a boat cruising in a fishing area. The boat is towing a net B by means of a pair of towing warps 15 and 17. The towing warps 15 and 17 are respectively connected to left and right hand planing frustoconical members C and D.

Figure 1:
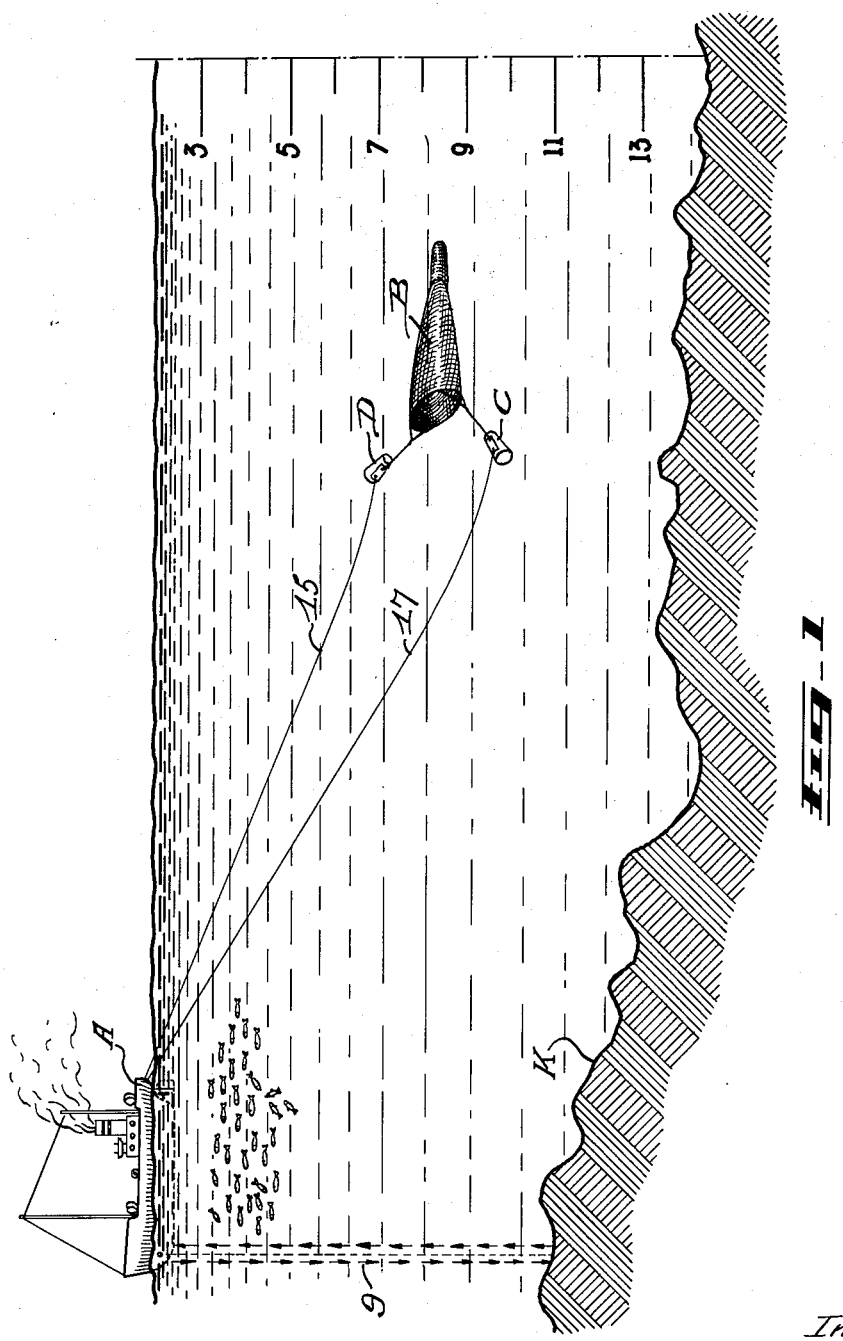
Figure 1 is a diagrammatic illustration of a complete trawling operation in accordance with the invention.

The boat A is preferably a trawler equipped with the usual trawling equipment required for an otter trawl, that is to say, with winches, lifting equipment for the doors and so on. The boat is also preferably equipped with an echo sounding device whereby schools of fish may be observed. In Figure 1 the signals to and from the echo sounding device are indicated at 9, reflected from the sea bed K.

In accordance with the invention, each planing frustoconical member C and D is constructed so as to have a main hollow body of tapering frustoconical outline preferably constructed from strong light material, for example, marine alloy aluminium, fiber glass or other suitable material.

Figure 3:
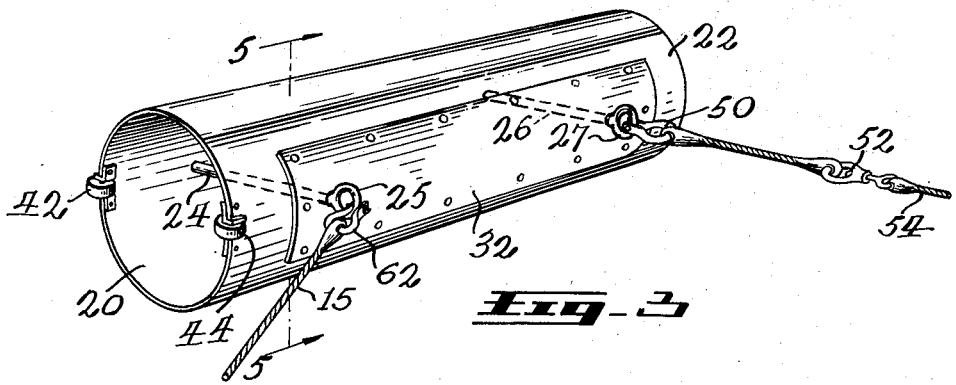
Figure 3 is a perspective view showing the right hand cone of the gear shown in Figure 2.
Figure 4:
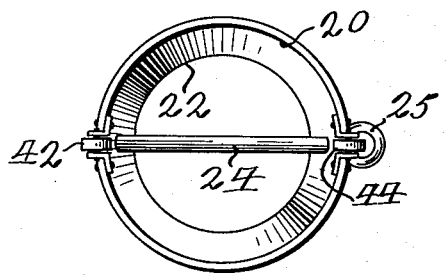
Figure 4 is an end view from the large end of the structure shown in Figure 3.
Figure 5:
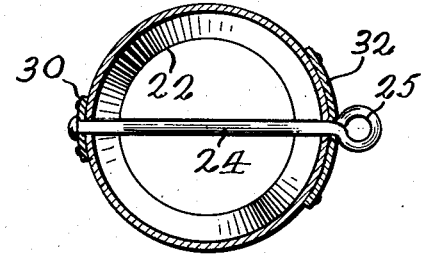
Figure 5 is a cross-sectional view of Figure 3 along the line 5—5.

With particular reference to Figures 3, 4 and 5 each frustoconical member is illustrated as being constructed so as to have a wide open end 20 and a narrow open end 22. The open end 20 is the front end of the planing frustoconical members and the open end 22 the rear end. Each frustoconical member is reinforced by bars 24, 26 preferably of stainless steel, which extend diametrically across the frustoconical members adjacent the front end 20 and rear end 22 so as to protrude beyond the side surface of the frustoconical members as shown in detail in Figures 4 and 5. Reinforcing plates 30, 32 are provided so as to provide adequate support for the terminal ends of the bars 24, 26 and the ends of the bars protruding beyond the plate 32 are formed so as to constitute rings to which the various connections can be made. The bar 24 is provided with a ring 25 and the bar 26 is provided with a ring 27.

Figure 6:
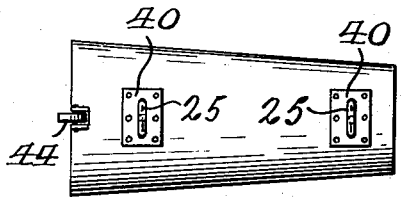
Figure 6 is a view in plan of a similar tapering cylindrical planing cone construction with an alternative reinforcing plate arrangement.

As is shown in Figure 6, if desired, the large plate 32 can be replaced by two smaller spaced apart plates 40, the bars 24 and 26 being located in the same manner as shown in Figure 3. Rollers 42, 44 are mounted for rotation in diametrically opposed relationship on the front open end 20. These are provided so that when the device is hoisted inboard the rollers 42, 44 bear against the sides of the ship so as to reduce friction.

Figure 2:
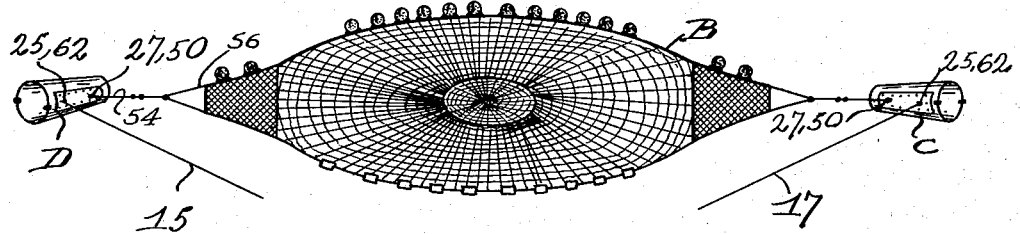
Figure 2 is an enlarged view showing the mouth of the net, the planing cones and towing connections.

As is shown in Figure 3, a suitable shackle 50 is secured to the ring 27 to form a connection between a swivel 52 and the wing line 54 extending from the bridle 56 of the net. A suitable towing warp 15 is connected to the front ring 25 by a shackle 62 so that the device can be towed by the warps from a towing craft. As will be appreciated, the port or left hand frustoconical member is the same as the starboard or right hand frustoconical member shown in Figure 3. The frustoconical members C and D are disposed at each side, as shown in Figure 2, so as to hold the net open when the frustoconical members are towed through the water by the towing craft. The connections to the net are such that when the trawl is towed the frustoconical members plane outwards keeping the net in fishing position.

It will be understood, of course, that the structure of the planing frustoconical member may be modified within the spirit of the invention, for example, it may be manufactured from other materials than those mentioned. It might be made completely of metal or plastic material. But, one skilled in the art will appreciate that it must be strong enough to withstand the very heavy water pressure encountered. The trawling gear such as the net, towing warps and other gear is conventional of itself but, of course, is combined in a particular manner according to the invention.

*Operation*

The towing operation is as follows. The apparatus for shooting this trawl is similar to that for shooting an otter trawl. The trawler normally moves along at trawling speed towing the net by means of the towing warps.

The weight of the frustoconical members and net at slow trawling speed causes them to sink. As speed is increased, the tapering body and points of connection stabilize each of the frustoconical members in such a manner that they tend to move through the water on an even keel. And the pressure bearing against the frustoconical members and net with increased speed causes the frustoconical members and net to rise in the water but still maintaining fishing position. The pressure of the water against the frusoconical members which are held at a certain inclination to the direction of trawling causes the doors to move outwards but the connection with the net limits this outward movement at a fixed lateral position and at the same time the mouth of the net is kept open.

The tapering shape and non-buoyant construction tend first to weight the cone and make it heavier than water and second to tip the front of the frustoconical member down so that it tends to dive. But, when the weight of the net comes on to the back of the frustoconical member, it compensates for the weight on the front and stabilizes it. So the doors move along in the direction of trawling with the exception that their inclination by their connections to the towing warps and to the net tend to make them move outwards thereby stabilizing the whole operation.

To give a further example of how the net would be used in practice, consider a typical fishing operation. Say the trawler A is moving along at slow trawling speed of three or four knots. Then the net would be fishing say at 10 fathoms as shown in the drawing. At this point fish are observed at 5 fathoms on the echo sounder. The speed is immediately increased to bring the mouth of the net to the 5 fathoms level. The net would, therefore, tow into the fish and make a catch. At this juncture the net would be hauled in and the fish taken aboard.

The shape of the frustoconical member may be varied to suit various conditions as for example, the speed of the vessel. This is an empirical problem and can be solved by experiment. Actually, only relatively slight conicality is necessary to give the door sufficient resistance to keep fore and aft in proper relationship.

I claim:

1. A door for a mid-water trawl, comprising a hollow body of frustoconical formation having open ends, the wider end of said conical body constituting the front end of said door and the narrow end of said conical body constituting the rear end of said door, reinforcing and connecting means mounted on said conical body in spaced apart relationship adjacent said front and rear ends respectively, said front connecting means being adapted to receive a tow line and said rear connecting means being adapted to receive a traction line extending from a net.

2. A door as claimed in claim 1 wherein said reinforcing and connecting means comprise bars extending diametrically across said body adjacent the front and rear end thereof with portions of said bars extending beyond said body being shaped to provide connecting rings.

3. A door for a mid-water trawl comprising a hollow main body of symmetrical tapering outline having open ends, the wider end of said body constituting the front end of said door and the narrower end of said body constituting the rear end of said door, and a pair of connecting members mounted on said body in spaced apart relationship adjacent the front and rear ends respectively, said front connecting member being adapted to receive a tow line and said rear connecting member being adapted to receive a traction line extending from a net.

4. A door as claimed in claim 3 wherein there are interior re-enforcing members extending across the longitudinal axis of said body adjacent the front and rear ends, respectively.

References Cited in the file of this patent

UNITED STATES PATENTS

| | | |
|---|---|---|
| 661,100 | Delany | Nov. 6, 1900 |
| 671,865 | Mowrer | Apr. 9, 1901 |
| 1,645,874 | Sanford | Oct. 18, 1927 |

FOREIGN PATENTS

| | | |
|---|---|---|
| 341,055 | Great Britain | Jan. 12, 1931 |
| 507,705 | Germany | Sept. 19, 1930 |